(12) United States Patent
Bitran et al.

(10) Patent No.: US 12,737,458 B2
(45) Date of Patent: Sep. 15, 2026

(54) SYSTEM AND METHOD FOR SAFEGUARDING MODELS

(71) Applicant: Microsoft Technology Licensing, LLC, Redmond, WA (US)

(72) Inventors: Hadas Bitran, Ramat Hasharon (IL); Aaron Toby Bornstein, Zikhron Yaakov (IL); Tal Baumel, Tel-Aviv (IL); Ksenya Kveler, Nesher (IL); Ran Efrati, Tel-Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 41 days.

(21) Appl. No.: 18/744,314

(22) Filed: Jun. 14, 2024

(65) Prior Publication Data

US 2025/0315521 A1 Oct. 9, 2025

Related U.S. Application Data

(60) Provisional application No. 63/575,001, filed on Apr. 5, 2024.

(51) Int. Cl.
*G06F 21/55* (2013.01)
*G06N 3/0475* (2023.01)

(52) U.S. Cl.
CPC ......... *G06F 21/554* (2013.01); *G06N 3/0475* (2023.01); *G06F 2221/034* (2013.01)

(58) Field of Classification Search
CPC ............ G06F 21/554; G06F 2221/034; G06N 3/0475
See application file for complete search history.

(56) References Cited

U.S. PATENT DOCUMENTS 11,526,512 B1 * 12/2022 Halabi .................. G06F 40/289
11,694,815 B2 * 7/2023 Bettencourt-Silva ........................ G06N 20/00 707/748
2012/0078837 A1 * 3/2012 Bagchi ................ G06F 16/2428 706/52
2025/0005060 A1 * 1/2025 Phiri ................... G06F 21/6245
2025/0046407 A1 * 2/2025 Santiago ................ G16H 50/20
2025/0111940 A1 * 4/2025 Dent ....................... G06T 13/40
2025/0124024 A1 * 4/2025 Kirk ...................... G06F 21/602
2025/0190801 A1 * 6/2025 Lucas ................. G06N 3/0895

* cited by examiner

*Primary Examiner* — Carl G Colin
*Assistant Examiner* — Zhe Liu
(74) *Attorney, Agent, or Firm* — Foley IP Law, PLLC

(57) ABSTRACT

A computer-implemented method, computer program product and computing system for: enabling a generative AI system to effectuate an analysis protocol; enabling a user to utilize the generative AI system during an interactive session concerning the analysis protocol; receiving content during the interactive session, thus defining received content; and determining whether the received content is relevant with respect to the analysis protocol.

19 Claims, 3 Drawing Sheets

SYSTEM AND METHOD FOR SAFEGUARDING MODELS

RELATED APPLICATION(S)

This application claims the benefit of U.S. Provisional Application No. 63/575,001, filed on 5 Apr. 2024, the entire contents of which are incorporated herein by reference.

TECHNICAL FIELD

This disclosure relates to generative AI systems and, more particularly, to systems for safeguarding generative AI systems.

BACKGROUND

Safeguarding generative AI systems against hallucinations is crucial for a myriad of interconnected reasons that span trust, safety, ethics, and beyond. Trust and reliability are foundational to the user's engagement with AI; if a model is known to generate false or misleading outputs, its credibility and utility in decision-making processes are severely compromised. This issue extends into safety concerns, particularly in critical fields such as healthcare, finance, and autonomous driving, where inaccuracies could lead to harmful consequences. Beyond safety, the ethical implications of AI-generated misinformation cannot be overstated. AI hallucinations can perpetuate biases, spread falsehoods, and generate harmful content, raising significant ethical, legal, and social issues. In an age rife with misinformation, the role of AI should be to uphold the integrity of information, not undermine it. Furthermore, the user experience deteriorates when interactions with AI result in irrelevant or incorrect information, potentially eroding confidence in AI-powered technologies.

BRIEF DESCRIPTION OF THE DRAWINGS

Like reference symbols in the various drawings indicate like elements.

DETAILED DESCRIPTION OF THE PREFERRED EMBODIMENTS

As will be discussed in greater detail below, implementations of the present disclosure may enable a user to interact with a generative AI system during an interactive session concerning an analysis protocol; and determine whether received content (be it from the user or the generative AI system) is relevant with respect to the analysis protocol.

By processing the received content that is provided by the user or the generative AI system, the interaction between the user and the generative AI system may be controlled to e.g., prevent hallucinations by the generative AI system and/or inappropriate inquiries by the user.

The details of one or more implementations are set forth in the accompanying drawings and the description below. Other features and advantages will become apparent from the description, the drawings, and the claims.

Figure 1:
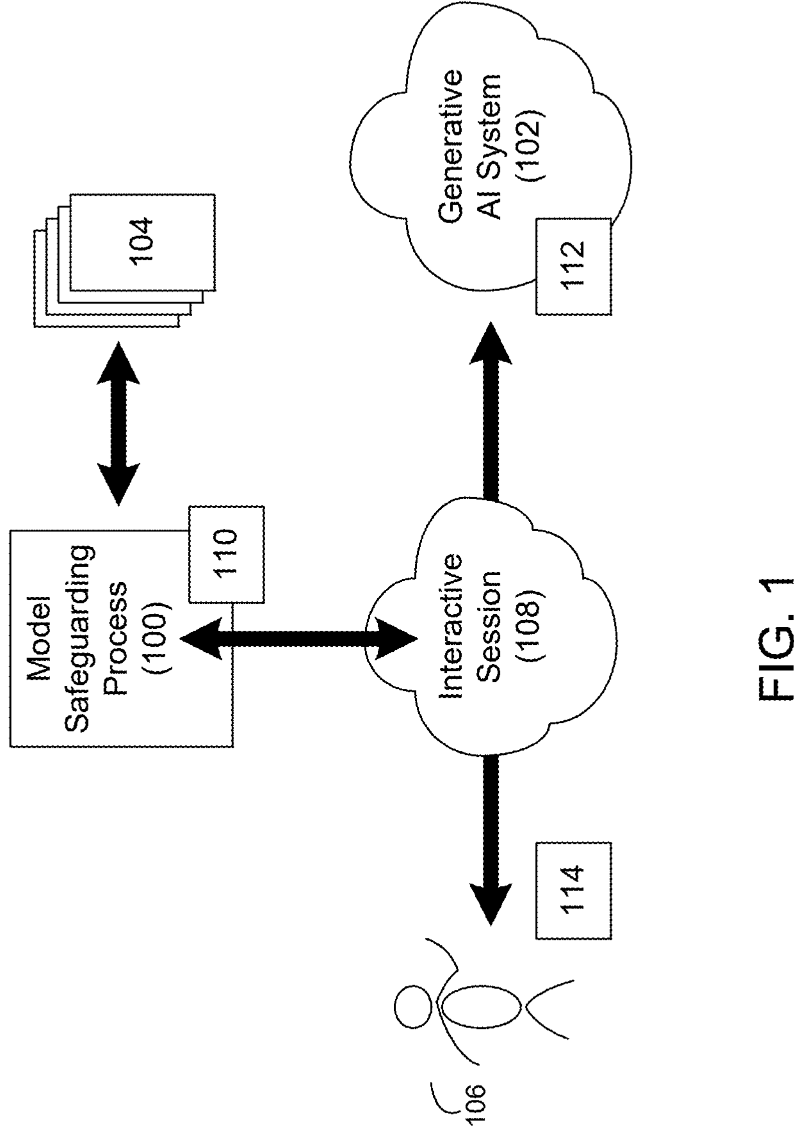
FIG. 1 is a diagrammatic view of a model safeguarding process in accordance with various embodiments of the present disclosure.
Figure 2:
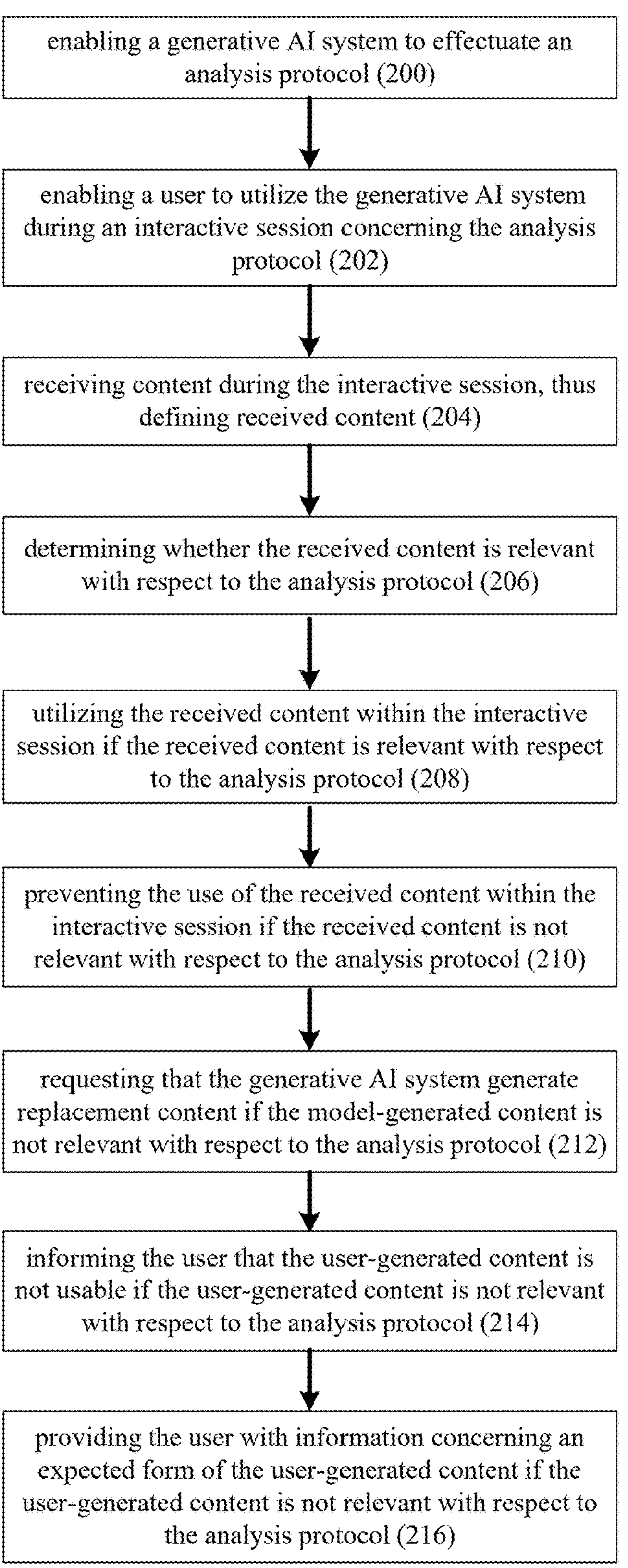
FIG. 2 is a flow chart of one implementation of the model safeguarding process of FIG. 1 in accordance with various embodiments of the present disclosure.

Model Safeguarding Process:

Referring to FIGS. 1-2, model safeguarding process 100 may enable 200 a generative AI system (e.g., generative AI system 102) to effectuate an analysis protocol (e.g., analysis protocol 104).

A generative AI system (e.g., generative AI system 102) is a type of artificial intelligence that is designed to generate or create content, often in the form of text, images, audio, or other media, based on patterns and knowledge learned from large datasets. These systems (e.g., generative AI system 102) use machine learning techniques, particularly deep learning, to understand and replicate the structures and features present in the data that they have been trained on. Such systems can then produce new content that is similar in style, format, or content to the data they've been exposed to.

Generative AI systems (e.g., generative AI system 102) have a wide range of applications, including:

- Natural Language Generation (NLG): These systems can generate human-like text, including articles, stories, chatbot responses, and more. They are used in content generation, automated report writing, and even creative writing.
- Image Generation: Generative models can create images, artwork, or even deepfake videos that resemble real images, often used in creative fields, image synthesis, and data augmentation for machine learning.
- Music and Audio Generation: These systems can compose music or generate audio, including speech synthesis. They are used in music composition, voice assistants, and audio effects generation.
- Data Augmentation: Generative AI can be used to create synthetic data to augment limited datasets for machine learning tasks, improving model performance.
- Style Transfer: Generative AI can apply artistic styles to images or convert images from one artistic style to another, creating unique visual effects.

One of the most well-known types of generative AI systems is the Generative Adversarial Network (GAN), where two neural networks, a generator and a discriminator, work in tandem to create content and evaluate its authenticity. This adversarial training process helps the generator improve its content generation capabilities over time.

As used in this disclosure, an analysis protocol (e.g., analysis protocol 104), by its very nature, is a foundational element in various research and analytical endeavors. This detailed framework not only delineates the approach for conducting an analysis but also acts as a critical instrument for ensuring the integrity, consistency, and replicability of the research process. By explicitly stating the objectives of the analysis, the protocol (e.g., analysis protocol 104) provides a clear direction and purpose, aligning the research activities towards achieving specific outcomes. The methodology section of the protocol (e.g., analysis protocol 104) is its core, specifying the techniques and procedures for data collection, analysis, and interpretation.

In the healthcare space, analysis protocols (e.g., analysis protocol 104) are essential for ensuring that clinical practices, research, and diagnostic procedures are performed consistently, safely, and in accordance with the latest scientific evidence. These protocols (e.g., analysis protocol 104) cover a broad spectrum of activities, from patient care and treatment to laboratory testing and medical research, examples of which may include but are not limited to:

- Clinical Practice Guidelines (CPGs): Clinical Practice Guidelines are systematically developed statements to assist practitioner and patient decisions about appropriate health care for specific clinical circumstances. For example, the American Heart Association (AHA) might publish guidelines for the management of patients with acute myocardial infarction. These guidelines would include protocols for diagnosis, treatment options, management of complications, and post-discharge care, all based on the latest evidence and expert consensus.
- Laboratory Testing Protocols: Laboratory tests are fundamental in diagnosis and monitoring of diseases. A protocol for a blood glucose test, for instance, details the methods for collecting blood samples, the acceptable timing of collection (considering fasting requirements), handling and storage of samples, the testing procedure itself, and interpretation of results. This ensures accuracy in diagnosis and monitoring of conditions like diabetes.
- Imaging Protocol in Radiology: Imaging protocols standardize the procedures for medical imaging, including the selection of imaging modalities (e.g., X-ray, MRI, CT scans), patient preparation, positioning, and parameters for image acquisition. A specific example could be an MRI protocol for detecting brain tumors, specifying the MRI sequences, slice thickness, and contrast agent use, ensuring that the images produced are of high quality and diagnostic value.
- Surgical Safety Protocols: These protocols are designed to enhance patient safety and outcomes in surgical procedures. The World Health Organization's (WHO) Surgical Safety Checklist is a prime example, encompassing pre-operative, intra-operative, and post-operative phases to verify patient identity, surgical site and procedure, and ensure that all surgical equipment and safety measures are in place before the procedure begins.
- Pharmacological Treatment Protocols: Treatment protocols define standardized medication regimens for various conditions, specifying drug choices, dosages, routes of administration, and duration of therapy. For example, protocols for antiretroviral therapy in HIV patients detail first-line and second-line drug regimens, monitoring schedules, and criteria for switching therapies in response to treatment failure or adverse effects.

These examples underline the critical role of analysis protocol (e.g., analysis protocol 104) in healthcare, guiding professionals through complex decision-making processes to ensure that care is based on the best available evidence, thereby optimizing patient outcomes.

Model safeguarding process 100 may enable 202 a user (e.g., user 106) to utilize the generative AI system (e.g., generative AI system 102) during an interactive session (e.g., interactive session 108) concerning the analysis protocol (e.g., analysis protocol 104).

As discussed above, the analysis protocol (e.g., analysis protocol 104) may be a clinical diagnostic protocol in the healthcare space. Such protocols (e.g., analysis protocol 104) may be used by a clinician and may guide them through a series of questions to aid in the disease diagnosis for a patient. Other protocols (e.g., analysis protocol 104) may guide a patient through a series of questions so that information may be gathered from the patient to diagnose (or assist in diagnosing) a disease for the patient. Accordingly and in such a configuration, the user (e.g., user 106) of the generative AI system (e.g., generative AI system 102) may include a clinician and/or a patient.

In a medical environment, a clinician (also referred to as "healthcare provider" or "medical professional") refers to a healthcare professional who is directly involved in patient care, diagnosis, treatment, and management. Clinicians include a wide range of professionals with different levels of training and specialties, such as physicians (including medical doctors and doctors of osteopathic medicine), nurses, physician assistants, nurse practitioners, and other allied health professionals like pharmacists, physical therapists, and occupational therapists.

Clinicians play a central role in providing comprehensive healthcare services to patients, often working collaboratively within interdisciplinary teams to address the diverse needs of patients. They are responsible for conducting patient assessments, making diagnoses, developing treatment plans, prescribing medications, performing procedures, and providing ongoing monitoring and follow-up care.

Model safeguarding process 100 may receive 204 content during the interactive session (e.g., interactive session 108), thus defining received content (e.g., content 110). Examples of the content (e.g., content 110) received during the interactive session (e.g., interactive session 108) may include but are not limited to: model-generated content (e.g., content 110) and user-generated content (e.g., content 110).

- Model-Generated Content: Examples of model-generated content may include any content that is generated by the generative AI system (e.g., generative AI system 102). Such model-generated content may be proactive in nature (e.g., content generated without prompting from the user (e.g., user 106) or reactive in nature (e.g., content generated in response to prompting from the user (e.g., user 106).
- User-Generated Content: Examples of user-generated content may include any content that is generated by the user (e.g., user 106). Such user-generated content may be proactive in nature (e.g., content generated without prompting from the generative AI system (e.g., generative AI system 102) or reactive in nature (e.g., content generated in response to prompting from the generative AI system (e.g., generative AI system 102).

Model safeguarding process 100 may determine 206 whether the received content (e.g., content 110) is relevant with respect to the analysis protocol (e.g., analysis protocol 104).

For example, model safeguarding process 100 may utilize 208 the received content (e.g., content 110) within the interactive session (e.g., interactive session 108) if the received content (e.g., content 110) is relevant with respect to the analysis protocol (e.g., analysis protocol 104). As will be discussed below in greater detail, the received content (e.g., content 110) may be deemed relevant with respect to the analysis protocol (e.g., analysis protocol 104) if model safeguarding process 100 considers the received content (e.g., content 110) to be e.g., proper/appropriate/accurate/topical with respect to the analysis protocol (e.g., analysis protocol 104).

Conversely, model safeguarding process 100 may prevent 210 the use of the received content (e.g., content 110) within the interactive session (e.g., interactive session 108) if the received content (e.g., content 110) is not relevant with respect to the analysis protocol (e.g., analysis protocol 104). As will be discussed below in greater detail, the received content (e.g., content 110) may be deemed not relevant with respect to the analysis protocol (e.g., analysis protocol 104) if model safeguarding process 100 considers the received content (e.g., content 110) to be e.g., improper/inappropriate/inaccurate/non-topical with respect to the analysis protocol (e.g., analysis protocol 104).

Accordingly and for this example, assume that the content received during the interactive session (e.g., interactive session 108) is model-generated content (e.g., content 110).

Model safeguarding process 100 may utilize the model-generated content (e.g., content 110) if the model-generated content (e.g., content 110) is relevant with respect to the analysis protocol (e.g., analysis protocol 104).

For example, assume that the interactive session (e.g., interactive session 108) concerns an analysis protocol (e.g., analysis protocol 104) that is used to diagnose the severity of a patient's headaches so that a treatment plan may be defined. Accordingly, assume that the user (e.g., user 106) is the patient experiencing the headaches. Further, assume that the model-generated content (e.g., content 110) is the inquiry "How many headache days do you have in an average week?" Model safeguarding process 100 may utilize this model-generated content (e.g., content 110), as content 110 (i.e., "How many headache days do you have in an average week?") may be deemed relevant with respect to the analysis protocol (e.g., analysis protocol 104), as such received content (e.g., content 110) may be considered to be e.g., proper/appropriate/accurate/topical with respect to the analysis protocol (e.g., analysis protocol 104).

Conversely, model safeguarding process 100 may request 212 that the generative AI system (e.g., generative AI system 102) generate replacement content (e.g., replacement content 112) if the model-generated content (e.g., content 110) is not relevant with respect to the analysis protocol (e.g., analysis protocol 104).

Continuing with the same example, assume that the model-generated content (e.g., content 110) is the inquiry "Do you believe that humans ever landed on the moon?" Model safeguarding process 100 may request 212 that the generative AI system (e.g., generative AI system 102) generate replacement content (e.g., replacement content 112), as content 110 (i.e., "Do you believe that humans ever landed on the moon?") may be deemed not relevant with respect to the analysis protocol (e.g., analysis protocol 104), as such received content (e.g., content 110) may be considered to be e.g., improper/inappropriate/inaccurate/non-topical with respect to the analysis protocol (e.g., analysis protocol 104). Once replacement content 112 is generated, it will be reviewed to determine if it is relevant with respect to the analysis protocol (e.g., analysis protocol 104).

Additionally/alternatively and for this example, assume that the content received during the interactive session (e.g., interactive session 108) is user-generated content (e.g., content 110).

Model safeguarding process 100 may utilize the user-generated content (e.g., content 110) if the user-generated content (e.g., content 110) is relevant with respect to the analysis protocol (e.g., analysis protocol 104).

Continuing with the same example, assume that the user-generated content (e.g., content 110) is a response to the inquiry "How many headache days do you have in an average week?" . . . namely "five to six days per week." Model safeguarding process 100 may utilize this user-generated content (e.g., content 110), as content 110 (i.e., "five to six days per week.") may be deemed relevant with respect to the analysis protocol (e.g., analysis protocol 104), as such received content (e.g., content 110) may be considered to be e.g., proper/appropriate/accurate/topical with respect to the analysis protocol (e.g., analysis protocol 104).

Conversely, model safeguarding process 100 may not utilize the user-generated content (e.g., content 110) if the user-generated content (e.g., content 110) is not relevant with respect to the analysis protocol (e.g., analysis protocol 104).

For example, model safeguarding process 100 may inform 214 the user (e.g., user 106) that the user-generated content (e.g., content 110) is not usable if the user-generated content (e.g., content 110) is not relevant with respect to the analysis protocol (e.g., analysis protocol 104).

Continuing with the same example, assume that the user-generated content (e.g., content 110) is a response to the inquiry "How many headache days do you have in an average week?" . . . namely "my favorite color is blue." Model safeguarding process 100 may not utilize this user-generated content (e.g., content 110), as content 110 (i.e., "my favorite color is blue.") may be deemed not relevant with respect to the analysis protocol (e.g., analysis protocol 104), as such received content (e.g., content 110) may be considered to be e.g., improper/inappropriate/inaccurate/non-topical with respect to the analysis protocol (e.g., analysis protocol 104). Accordingly, model safeguarding process 100 may inform 214 the user (e.g., user 106) that content 110 (i.e., "my favorite color is blue.") is not usable and ask them to "please try again" since the user-generated content (e.g., content 110) is not relevant with respect to the analysis protocol (e.g., analysis protocol 104).

Further, model safeguarding process 100 may provide 216 the user (e.g., user 106) with information (e.g., information 114) concerning an expected form of the user-generated content (e.g., content 110) if the user-generated content (e.g., content 110) is not relevant with respect to the analysis protocol (e.g., analysis protocol 104).

Continuing with the same example in which the user-generated content (e.g., content 110) is "my favorite color is blue.", model safeguarding process 100 may not utilize this user-generated content (e.g., content 110) and may provide 216 the user (e.g., user 106) with information (e.g., information 114) concerning an expected form of the user-generated content (e.g., content 110). For example, model safeguarding process 100 may provide 216 the user (e.g., user 106) with information (e.g., information 114) that states "The question asked was how many headache days do you have in an average week?Please provide an answer that is in the form of a number between zero and seven."

Figure 3:
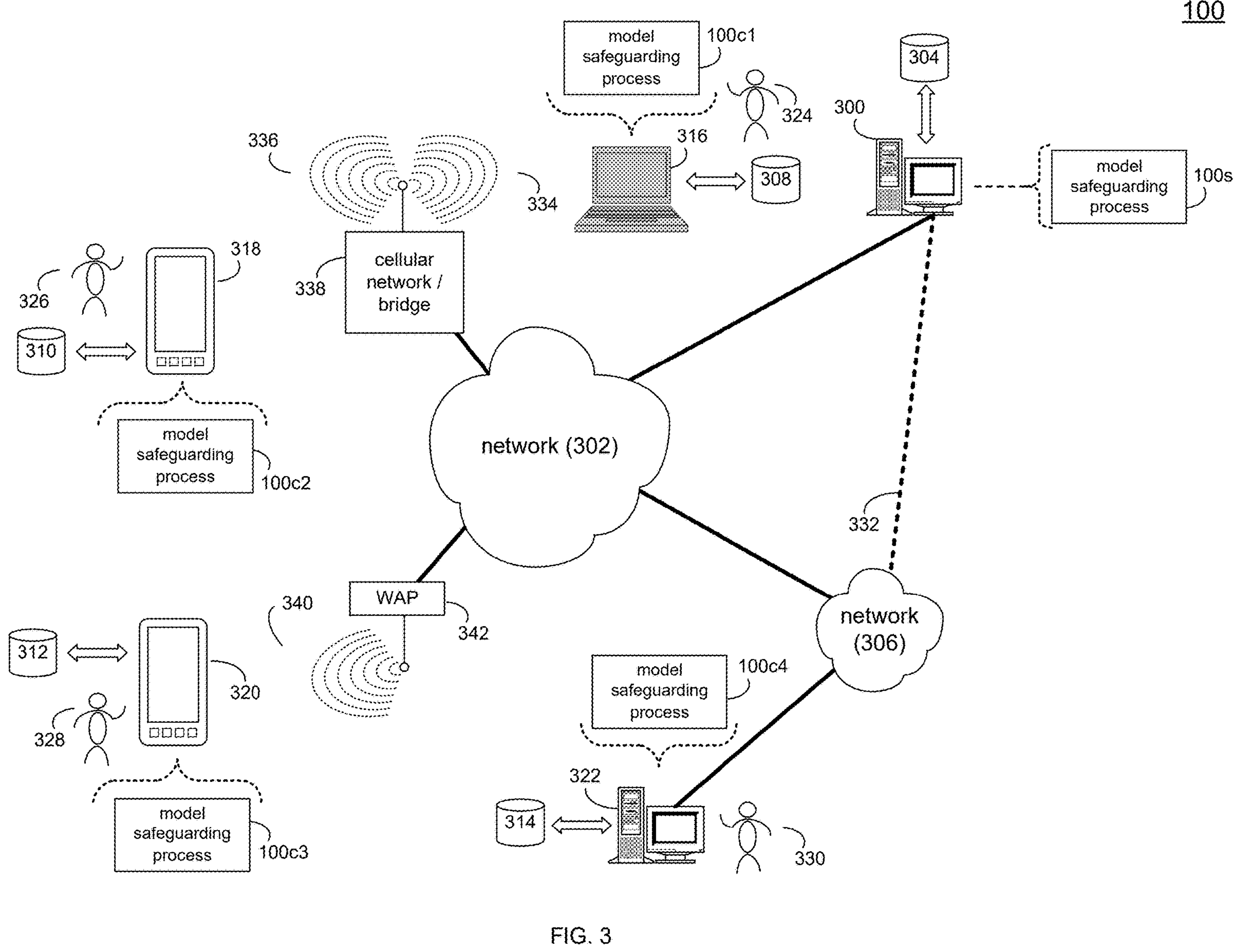
FIG. 3 is a diagrammatic view of a computer system and the model safeguarding process of FIG. 1 coupled to a distributed computing network in accordance with various embodiments of the present disclosure.

System Overview:

Referring to FIG. 3, there is shown model safeguarding process 100. Model safeguarding process 100 may be implemented as a server-side process, a client-side process, or a hybrid server-side/client-side process. For example, model safeguarding process 100 may be implemented as a purely server-side process via model safeguarding process 100*s*. Alternatively, model safeguarding process 100 may be implemented as a purely client-side process via one or more of model safeguarding process 100*cl*, model safeguarding process 100*c*2, model safeguarding process 100*c*3, and model safeguarding process 100*c*4. Alternatively still, model safeguarding process 100 may be implemented as a hybrid server-side/client-side process via model safeguarding process 100*s* in combination with one or more of model safeguarding process 100*cl*, model safeguarding process 100*c*2, model safeguarding process 100*c*3, and model safeguarding process 100*c*4.

Accordingly, model safeguarding process 100 as used in this disclosure may include any combination of model safeguarding process 100*s*, model safeguarding process 100*cl*, model safeguarding process 100*c*2, model safeguarding process 100*c*3, and model safeguarding process 100*c*4.

Model safeguarding process 100*s* may be a server application and may reside on and may be executed by computing device 300, which may be connected to network 302 (e.g., the Internet or a local area network). Examples of computing device 300 may include, but are not limited to: a personal computer, a server computer, a series of server computers, a mini computer, a mainframe computer, a smartphone, or a cloud-based computing platform.

The instruction sets and subroutines of model safeguarding process 100*s*, which may be stored on storage device 304 coupled to computing device 300, may be executed by one or more processors (not shown) and one or more memory architectures (not shown) included within computing device 300. Examples of storage device 304 may include but are not limited to: a hard disk drive; a RAID device; a random-access memory (RAM); a read-only memory (ROM); and all forms of flash memory storage devices.

Network 302 may be connected to one or more secondary networks (e.g., network 306), examples of which may include but are not limited to: a local area network; a wide area network; or an intranet, for example.

Examples of model safeguarding processes 300*c*1, 300*c*2, 300*c*3, 300*c*4 may include but are not limited to a web browser, a game console user interface, a mobile device user interface, or a specialized application (e.g., an application running on e.g., the Android™ platform, the iOS™ platform, the Windows™ platform, the Linux™ platform or the UNIX™ platform). The instruction sets and subroutines of model safeguarding processes 300*c*1, 300*c*2, 300*c*3, 300*c*4, which may be stored on storage devices 308, 310, 312, 314 (respectively) coupled to client electronic devices 316, 318, 320, 322 (respectively), may be executed by one or more processors (not shown) and one or more memory architectures (not shown) incorporated into client electronic devices 316, 318, 320, 322 (respectively). Examples of storage devices 308, 310, 312, 314 may include but are not limited to: hard disk drives; RAID devices; random access memories (RAM); read-only memories (ROM), and all forms of flash memory storage devices.

Examples of client electronic devices 316, 318, 320, 322 may include, but are not limited to a personal digital assistant (not shown), a tablet computer (not shown), laptop computer 316, smart phone 318, smart phone 320, personal computer 322, a notebook computer (not shown), a server computer (not shown), a gaming console (not shown), and a dedicated network device (not shown). Client electronic devices 316, 318, 320, 322 may each execute an operating system, examples of which may include but are not limited to Microsoft Windows™, Android™, iOS™, Linux™, or a custom operating system.

Users 324, 326, 328, 330 may access model safeguarding process 10 directly through network 302 or through secondary network 306. Further, model safeguarding process 10 may be connected to network 302 through secondary network 306, as illustrated with link line 332.

The various client electronic devices (e.g., client electronic devices 316, 318, 320, 322) may be directly or indirectly coupled to network 302 (or network 306). For example, laptop computer 316 and smart phone 318 are shown wirelessly coupled to network 302 via wireless communication channels 334, 336 (respectively) established between laptop computer 316, smart phone 318 (respectively) and cellular network/bridge 338, which is shown directly coupled to network 302.

Further, smart phone 320 is shown wirelessly coupled to network 302 via wireless communication channel 340 established between smart phone 320 and wireless access point (i.e., WAP) 342, which is shown directly coupled to network 302. Additionally, personal computer 322 is shown directly coupled to network 306 via a hardwired network connection.

WAP 342 may be, for example, an IEEE 802.11a, 802.11b, 802.11g, 802.11n, Wi-Fi, and/or Bluetooth device that is capable of establishing wireless communication channel 340 between smart phone 320 and WAP 342. As is known in the art, IEEE 802.11x specifications may use Ethernet protocol and carrier sense multiple access with collision avoidance (i.e., CSMA/CA) for path sharing. As is known in the art, Bluetooth is a telecommunications industry specification that allows e.g., mobile phones, computers, and personal digital assistants to be interconnected using a short-range wireless connection.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A method comprising:

monitoring, by a model safeguarding processor, an interactive session between a user and a generative Artificial Intelligence (AI) system to ensure that content exchanged between the user and the generative AI system complies with a Clinical Practice Guideline (CPG) based (CPG-based) protocol, the model safeguarding processor being independent from the generative AI system, wherein monitoring the interactive session includes:

receiving, by the model safeguarding processor, model-generated content output by the generative AI system based on information provided by the user, wherein the model-generated content includes an initial inquiry for the user;

processing, by the model safeguarding processor without presenting the initial inquiry to the user, the model-generated content based on the CPG-based protocol to determine that the initial inquiry is not relevant to, or otherwise lacks compliance with, the CPG-based protocol;

sending, by the model safeguarding processor, a request to the generative AI system upon determining that the initial inquiry is not relevant to, or otherwise lacks compliance with, the CPG-based protocol, the request prompting the generative AI system to provide a replacement inquiry for the user; and presenting, by the model safeguarding processor, the replacement inquiry to the user in lieu of the initial inquiry responsive to confirming that the replacement inquiry is relevant to, or otherwise complies with, the CPG-based protocol, wherein the replacement inquiry prompts the user to provide user-generated content in response to the replacement inquiry.

2. The method of claim 1, wherein the request sent from the model safeguarding processor to the generative AI system identifies the initial inquiry as not relevant to the CPG-based protocol.

3. The method of claim 1, wherein the request sent from the model safeguarding processor to the generative AI system identifies the initial inquiry as not compliant with the CPG-based protocol.

4. The method of claim 1, wherein the user is a clinician consulting with a patient to gather medical information about the patient.

5. The method of claim 1, wherein the user is a patient interacting directly with the generative AI system to provide medical information about the patient.

6. The method of claim 1, further comprising:

processing, by the model safeguarding processor, the user-generated content provided by the user in response to the replacement inquiry to determine that the user-generated content is not relevant to, or otherwise lacks compliance with, the CPG-based protocol;

sending, by the model safeguarding processor, an indication to the user upon determining that the user-generated content is not relevant to, or otherwise lacks compliance with, the CPG-based protocol, the indication prompting the user to provide replacement user-generated content for the generative AI system; and presenting, by the model safeguarding processor, the replacement user-generated content to the generative AI system in lieu of the user-generated content responsive to confirming that the replacement user-generated content is relevant to, or otherwise complies with, the CPG-based protocol.

7. The method of claim 6, wherein the indication provided to the user indicates that the user-generated content is not usable by the generative AI system.

8. The method of claim 6, wherein the indication provided to the user requests that the user provide the replacement user-generated content.

9. The method of claim 8, wherein the indication provided to the user indicates an expected form for the replacement user-generated content.

10. A computer program product residing on a computer memory having programming instructions stored thereon, the programming instructions, upon execution by one or more processors of a system, causing the system to perform the following operations:

monitoring, by a model safeguarding processor, an interactive session between a user and a generative Artificial Intelligence (AI) system to ensure that content exchanged between the user and the generative AI system complies with a Clinical Practice Guideline (CPG) based (CPG-based) protocol, the model safeguarding processor being independent from the generative AI system, wherein monitoring the interactive session includes:

receiving, by the model safeguarding processor, model-generated content output by the generative AI system based on information provided by the user, wherein the model-generated content includes an initial inquiry for the user;

processing, by the model safeguarding processor without presenting the initial inquiry to the user, the model-generated content based on the CPG-based protocol to determine that the initial inquiry is not relevant to, or otherwise lacks compliance with, the CPG-based protocol;

sending, by the model safeguarding processor, a request to the generative AI system upon determining that the initial inquiry is not relevant to, or otherwise lacks compliance with, the CPG-based protocol, the request prompting the generative AI system to provide a replacement inquiry for the user; and presenting, by the model safeguarding processor, the replacement inquiry to the user in lieu of the initial inquiry responsive to confirming that the replacement inquiry is relevant to, or otherwise complies with, the CPG-based protocol, wherein the replacement inquiry prompts the user to provide user-generated content in response to the replacement inquiry.

11. The computer program product of claim 10, wherein the user is a clinician consulting with a patient to gather medical information about the patient.

12. The computer program product of claim 10, wherein the user is a patient interacting directly with the generative AI system to provide medical information about the patient.

13. The computer program product of claim 10, wherein the programming instructions further cause the system to perform the following operations:

processing, by the model safeguarding processor, the user-generated content provided by the user in response to the replacement inquiry to determine that the user-generated content is not relevant to, or otherwise lacks compliance with, the CPG-based protocol;

sending, by the model safeguarding processor, an indication to the user upon determining that the user-generated content is not relevant to, or otherwise lacks compliance with, the CPG-based protocol, the indication prompting the user to provide replacement user-generated content for the generative AI system; and presenting, by the model safeguarding processor, the replacement user-generated content to the generative AI system in lieu of the user-generated content responsive to confirming that the replacement user-generated content is relevant to, or otherwise complies with, the CPG-based protocol.

14. The computer program product of claim 13, wherein the indication provided to the user requests that the user provide the replacement user-generated content and indicates an expected form for the replacement user-generated content.

15. A system comprising:

one or more processors; and memory storing programming instructions for execution by the one or more processors, the programming instructions, upon execution by the one or more processors, causing the system to perform the following operations:

monitoring, by a model safeguarding processor, an interactive session between a user and a generative Artificial Intelligence (AI) system to ensure that content exchanged between the user and the generative AI system complies with a Clinical Practice Guideline (CPG) based (CPG-based) protocol, the model safeguarding processor being independent from the generative AI system, wherein monitoring the interactive session includes:

receiving, by the model safeguarding processor, model-generated content output by the generative AI system based on information provided by the user, wherein the model-generated content includes an initial inquiry for the user;

processing, by the model safeguarding processor without presenting the initial inquiry to the user, the model-generated content based on the CPG-based protocol to determine that the initial inquiry is not relevant to, or otherwise lacks compliance with, the CPG-based protocol;

sending, by the model safeguarding processor, a request to the generative AI system upon determining that the initial inquiry is not relevant to, or otherwise lacks compliance with, the CPG-based protocol, the request prompting the generative AI system to provide a replacement inquiry for the user; and presenting, by the model safeguarding processor, the replacement inquiry to the user in lieu of the initial inquiry responsive to confirming that the replacement inquiry is relevant to, or otherwise complies with, the CPG-based protocol, wherein the replacement inquiry prompts the user to provide user-generated content in response to the replacement inquiry.

16. The system of claim 15, wherein the user is a clinician consulting with a patient to gather medical information about the patient.

17. The system of claim 15, wherein the user is a patient interacting directly with the generative AI system to provide medical information about the patient.

18. The system of claim 15, wherein the programming instructions further cause the system to perform the following operations:

processing, by the model safeguarding processor, the user-generated content provided by the user in response to the replacement inquiry to determine that the user-generated content is not relevant to, or otherwise lacks compliance with, the CPG-based protocol;

sending, by the model safeguarding processor, an indication to the user upon determining that the user-generated content is not relevant to, or otherwise lacks compliance with, the CPG-based protocol, the indication prompting the user to provide replacement user-generated content for the generative AI system; and presenting, by the model safeguarding processor, the replacement user-generated content to the generative AI system in lieu of the user-generated content responsive to confirming that the replacement user-generated content is relevant to, or otherwise complies with, the CPG-based protocol.

19. The system of claim 18, wherein the indication provided to the user requests that the user provide the replacement user-generated content and indicates an expected form for the replacement user-generated content.

* * * * *